United States Patent
Bloss et al.

(10) Patent No.: US 6,437,307 B1
(45) Date of Patent: Aug. 20, 2002

(54) IMAGE DETECTION MEMBER AND ASSEMBLY OF IMAGE DETECTION MEMBERS

(75) Inventors: Hans Bloss, Heroldsberg; Heino Möller, Erlangen, both of (DE)

(73) Assignee: Fraunhofer-Gesellschaft zur Forderung zur Angewandten Forshung e.V., Munich (DE)

( * ) Notice: Subject to any disclaimer, the term of this patent is extended or adjusted under 35 U.S.C. 154(b) by 0 days.

(21) Appl. No.: 09/508,072

(22) PCT Filed: Aug. 19, 1998

(86) PCT No.: PCT/DE98/02490
§ 371 (c)(1),
(2), (4) Date: Mar. 10, 2000

(87) PCT Pub. No.: WO99/14938
PCT Pub. Date: Mar. 25, 1999

(30) Foreign Application Priority Data

Sep. 12, 1997 (DE) .......................................... 197 40 612

(51) Int. Cl.⁷ .............................................. H01L 27/00
(52) U.S. Cl. .................... 250/208.1; 348/308; 348/315; 257/290; 257/291
(58) Field of Search ............................. 250/208.1, 332; 257/290, 291, 440; 348/272, 274, 275, 294, 308, 315

(56) References Cited

U.S. PATENT DOCUMENTS

| | | |
|---|---|---|
| 3,971,065 A | 7/1976 | Bayer |
| 4,242,700 A | * 12/1980 | Weimer .................. 358/44 |
| 4,558,365 A | 12/1985 | Ochi |
| 5,311,006 A | 5/1994 | Awamoto et al. |
| 5,471,515 A | * 11/1995 | Fossum et al. .............. 377/60 |
| 5,587,596 A | * 12/1996 | Chi et al. ................... 257/223 |
| 6,046,466 A | * 4/2000 | Ishida et al. ................ 257/258 |

FOREIGN PATENT DOCUMENTS

DE  3345147  6/1984

(List continued on next page.)

OTHER PUBLICATIONS

K. Medis et al., "CMOS Active Pixel Image Sensors for Highly Integrated Imaging Systems," *IEEE Journal of Solid–State Circuits*, vol. 32, No. 2, pp. 187–197, Feb. 1997.

(List continued on next page.)

*Primary Examiner*—Robert H. Kim
*Assistant Examiner*—Courtney Thomas
(74) *Attorney, Agent, or Firm*—Greenblum & Bernstein, P.L.C.

(57) ABSTRACT

A rectangular image sensor member with a predetermined length and width is provided, the rectangular image sensor member including a light sensitive surface; a circuit section; a wiring section for connecting the circuit section to an external circuit; a first surface portion in which the circuit section and wiring section are arranged; and the light sensitive surface being arranged outside of the first surface portion. Also provided is an apparatus including a plurality of rectangular image sensor members, each rectangular image sensor member having a predetermined length and width, and having a light-sensitive surface having a center-point; a circuit section; a wiring section for connecting the circuit section to an external circuit; a first portion in which the circuit section and wiring section are positioned; the light sensitive surface being located outside of the first portion; the plurality of rectangular image sensor members being arranged into a plurality of rows, wherein the center point of said light sensitive surfaces of one row are positionally offset from the center point of the light sensitive surfaces of an adjacent row.

19 Claims, 5 Drawing Sheets

FOREIGN PATENT DOCUMENTS

| | | |
|---|---|---|
| EP | 0511404 | 11/1992 |
| EP | 0641026 | 3/1995 |
| EP | 0747962 | 12/1996 |
| EP | 0788167 | 8/1997 |
| WO | 94/21998 | 9/1994 |
| WO | 96/31976 | 10/1996 |
| WO | 97/28558 | 8/1997 |

OTHER PUBLICATIONS

Peter Seitz, et al., SMART Image Sensors for Optical Microsystems, *Laser un Optoelectronik* 28(6), pp. 56–67.

Balch, "Replacing 16 mm Film Cameras with High Definition Digital Cameras," Ultrahigh and High–Speed Photography, Videography, and Photonics'94, Proceedings of SPIE—The International Society for Optical Engineering, Jul. 27–28, 1994, vol. 2273.

\* cited by examiner

IMAGE DETECTION MEMBER AND ASSEMBLY OF IMAGE DETECTION MEMBERS

CROSS-REFERENCE TO RELATED APPLICATIONS

The present application is a U.S. National Stage of International Application No. PCT/DE98/02490 filed Aug. 19, 1998 and claims priority under 35 U.S.C. §119 of German Patent Application No. 197 40 612.2 filed Sep. 12, 1997.

BACKGROUND OF THE INVENTION

1. Field of the Invention

The present invention relates to an image sensor having a light-sensitive surface, nonlight-sensitive circuit section, and a wiring section for connecting the circuit section, and wiring section.

2. Discussion of the Background Information

To record still or moving images in video technology, two main methods have become established in the past few years, photodiode arrays and CCD sensors. Currently, over 90% of all sensors that are used are CCD technology.

The photodiode array is the older technology, but in its original form it had several technologically-caused disadvantages that led to lower sensitivity, higher noises, lower speed, etc., which is why it has been displaced by the CCD sensors for the most part.

However, CCD sensors have the disadvantage that, due to the additional complexity of the manufacturing process and the increased manufacturing costs, they cannot easily be integrated with CMOS circuits. In addition, CCD sensors are high-capacity devices, so that on-chip CMOS driver electronics for large-surface assemblies would require very high power (2 to 3 W). Moreover, many different voltage levels are required for CCD sensors in order to ensure high efficiency of the charge transfer.

In contrast, progress in silicon technology has made it possible, in a photodiode array, to add a separate active processing unit (e.g., amplifier, etc.) to each image recording member, thereby eliminating the existing disadvantages of the photodiode arrays and, in particular, even creating new capabilities for image recording. This is known as "APS" ("active pixel sensor") technology. APS technology is currently considered to be very significant technologically for the future.

Improvements have been made to the known systems to increase image sharpness and resolution so that a sharp image with good resolution and high contrast can be represented with a predetermined number of image members. In that regard, it has been observed that a hexagonal arrangement of sexangular members, as also present in the retina of humans and animals, is also very advantageous. However, such an arrangement is linked to the problem that digital image processing is obviously hampered, because the individual image sensor members are not arranged in an assembly of columns and rows.

However, with regard to optimizing the assembly of image sensor members, the known CCD sensors have the disadvantage that CCD technology offers very little freedom with regard to the shape and arrangement of the pixels. In practice, only rectangular shapes of image sensor members, which are combined into a regular Cartesian matrix, are of importance.

In U.S. Pat. No. 3,971,065, an image sensor is described in which three different types of image sensor members, each consisting of CCD sensors, are arranged in such a way that the same types of image sensor members are arranged in the form of grids. More specifically, the various types of image sensor members each represent a first color, for example, green, a second color, for example, red, and the general brightness. The image sensor members for general brightness are disposed in a checkerboard pattern, while the image sensor members for the first color fill up the intermediate spaces in a first checkerboard pattern row, the image sensor members for the second color fill up the intermediate spaces in the second checkerboard pattern row, and so on. This is intended, on the one hand, to avoid the high complexity of the optical design and, on the other hand, to avoid the problems related to the conventional process of image position accuracy when using filters for different colors disposed behind one another.

Compared to the CCD sensors, when using APS-CMOS sensors in principle almost any chosen form with any chosen overall arrangement is feasible.

Figure 4A:
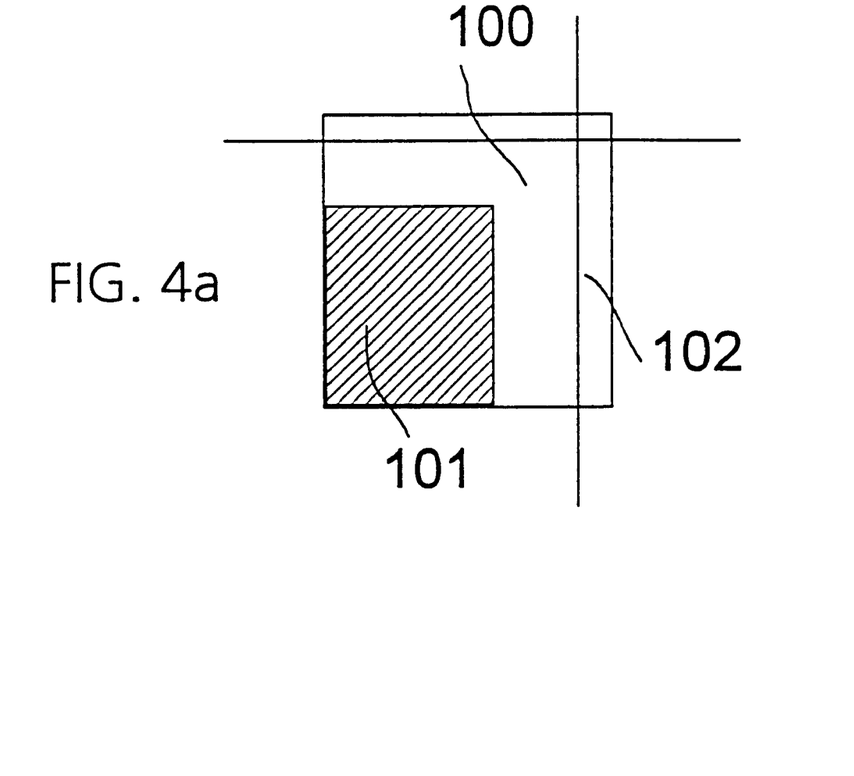
FIG. 4a shows a conventional image sensor member and FIG. 4b shows a conventional image sensor.
Figure 4B:
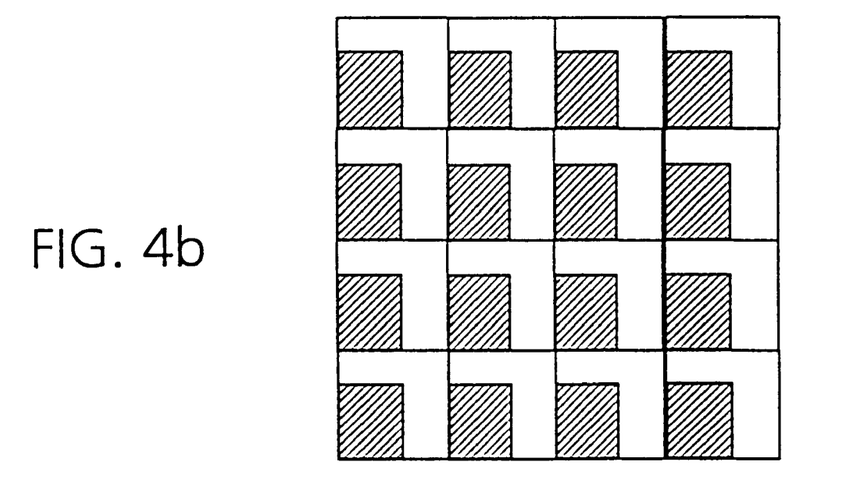

In a known AP sensor, as known, for example, from "CMOS Active Pixel Image Sensors for Highly Integrated Imaging Systems," Sunetra K. Mendis et al., IEEE Journal of Solid-State Circuits, Vol. 32 No. Feb. 2, 1997, or "Smar Image Sensors for Optical Microsystems," Peter Seitz, et al., Laser und Optoelectronik 28(6)/1996, an individual sensor member substantially comprises three components, which are disposed as shown in FIG. 4a:

1. A light-sensitive surface 101 in the form of a photodiode or a phototransistor
2. A circuit section 100 which, for example, includes multiple CMOS transistors and is generally not used for light sensors, to generate a signal corresponding to the incident light and processing of the signal
3. A wiring section 102 which connects the individual sensor image members to an overall sensor The arrangement of the components of the individual sensor members is determined according to switching and layout requirements and is not necessarily optimal for later additional processing of the image information. The sensor members are then arranged according to FIG. 4b into a matrix or other structures.

When optimizing the known image sensor members and image sensors, one skilled in the art will find himself in the field of tension of the following contradictory trends.

1. On the one hand, image sharpness and resolution can be improved by increasing the number of image sensors and enlarging the ratio of light-sensitive surface to image sensor surface.
2. On the other hand, the cost and speed of the resulting image sensor depend on the number of sensor members. In other words, the greater the number of sensor members, the slower and more expensive the resulting image sensor becomes.

SUMMARY OF THE INVENTION

An aspect of the present invention is therefore to improve the known image sensor member and the known assembly of image sensor members in such a way that the costs of the image sensor resulting from the image sensor members is reduced, its speed is increased, and, simultaneously, the image sharpness and resolution of the image sensor are not impaired.

According to an aspect of the present invention, an assembly of image sensor members is provided for line or column-wise recording of images, each having a light-sensitive surface; and a circuit section which in addition has a wiring section for connecting the individual circuit sections to one another and to the outside, in which the circuit section and the wiring section each occupy one part of the surface of the image sensor member characterized in that each center of gravity (centerpoints) of the light-sensitive surfaces of the individual image sensor members is disposed in the form of at least two square grids which are offset relative to one another, while the lines of the square grids are each parallel to the lines or columns of the image to be recorded.

According to a further aspect of the present invention, an assembly of image sensors members is provided wherein the light sensitive surface is disposed on one half of the image sensor member. According to a still further aspect of the present invention, the image sensors are used in a high-speed camera.

According to an aspect of the present invention, a rectangular image sensor member with a predetermined length and width is provided, the rectangular image sensor member including a light sensitive surface; a circuit section; a wiring section for connecting said circuit section to an external circuit; a first surface portion in which the circuit section and wiring section are arranged; and the light sensitive surface being arranged outside of said first surface portion.

According to another aspect of the present invention, the light-sensitive surface substantially covers the predetermined width. Additionally, other aspects of the present invention includes an image sensor member having a length to width ratio of about 2:1, 3:1, or 4:1. In another aspect of the present invention the light-sensitive surface is formed as one of a square, rectangle, hexagon, and circle.

According to a further aspect of the present invention, the light-sensitive surface is disposed on about one half of the image sensor member. In another aspect of the present invention, the light-sensitive surface is a photodiode, phototransistor, or photoresistor.

According to still a further aspect of the present invention, an apparatus is provided including a plurality of rectangular image sensor members, each rectangular image sensor member having a predetermined length and width, and ftirther including a light-sensitive surface having a centerpoint; a circuit section; a wiring section for connecting said circuit section to an external circuit; a first portion in which the circuit section and wiring section are positioned; the light sensitive surface being located outside of said first portion; the plurality of rectangular image sensor members being arranged into a plurality of rows, wherein the center point of the light sensitive surfaces of one row are positionally offset from the center point of the light sensitive surfaces of an adjacent row.

In another aspect of the present invention, row includes a plurality of members positioned to each other so that the predetermined widths of the members are vertically oriented and contiguous and the predetermined lengths of the member are horizontally oriented and aligned in a substantially parallel manner; wherein each row is configured so that the vertically oriented widths of said members with respect to a row above and row below a middle row, are offset from the vertically oriented width sides of each member of said middle row; and wherein said centerpoints of each light-sensitive surface are separated by a circuit section with respect to the rows and with respect to a vertical direction.

According to still a further aspect of the present invention the centerpoints in adjacent rows are positionally offset with respect to direction cross-wise to the rows. Further aspects of the invention include arranging the light-sensitive surface and at least a part of the first portion of a same image sensor member are arranged in a same row.

According to another aspect of the present invention, the rectangular image sensor members are arranged in a checkerboard pattern so that the light-sensitive surfaces are disposed between the circuit sections in horizontal and vertical directions and comers of the light-sensitive surfaces are contiguous in diagonal directions. According to a further aspect of the present invention, the light-sensitive surface substantially covers an entire width of the member.

According to an aspect of the present invention, the member has a length to width ratio of one of 2:1, 3:1, or 4:1. According to another aspect of the present invention, the light-sensitive surface is formed as a square, rectangle, hexagon, or circle. According to another aspect of the invention, the light-sensitive surface is disposed on about one half of said image sensor member.

According to another aspect of the present invention, the light-sensitive surface is a photodiode, phototransistor, and photoresistor. Additionally, other aspects of the present invention include the apparatus in combination with a high-speed camera.

In another aspect of the present invention, the apparatus includes wiring members connecting the wiring sections of the image sensor members to the circuit outside said image sensor member; and a calculation unit, connected to the wiring members, for interpolation of data obtained from the apparatus.

According to a further aspect of the present invention the centerpoints of image sensor members positioned in the row above and row below are aligned in a horizontal and vertical direction; and the centerpoints of image sensor members positioned in the middle row, are offset by half the distance between the distance between the centerpoints from the row above and row below, in a horizontal and vertical direction.

According to a further aspect of the invention, with respect to said cross-wise direction to the rows, centerpoints in adjacent rows are not aligned with each other. According to still a further aspect of the present invention, wherein the centerpoints of the one row are positioned substantially at a midpoint between adjacent centerpoints of the adjacent row.

In another aspect of the present invention, the external circuit includes a calculation unit adapted for interpolation of data, and the apparatus including wiring members arranged to connect the wiring sections to the calculation unit. Further aspects of the invention includes a spacing distance between adjacent centerpoints in each row is substantially the same, and wherein centerpoints in the one row are arranged at one-half of the spacing distance of the adjacent row.

The present invention is essentially based on the realization that the perfornance of an image sensor can be improved by disposing the centers of gravity (centerpoint) of the light-sensitive surfaces of the individual image sensor members in the form of at least two square grids which are offset relative to one another, with the lines of the square grids each being parallel to the lines or columns of the image to be recorded.

Figure 2:
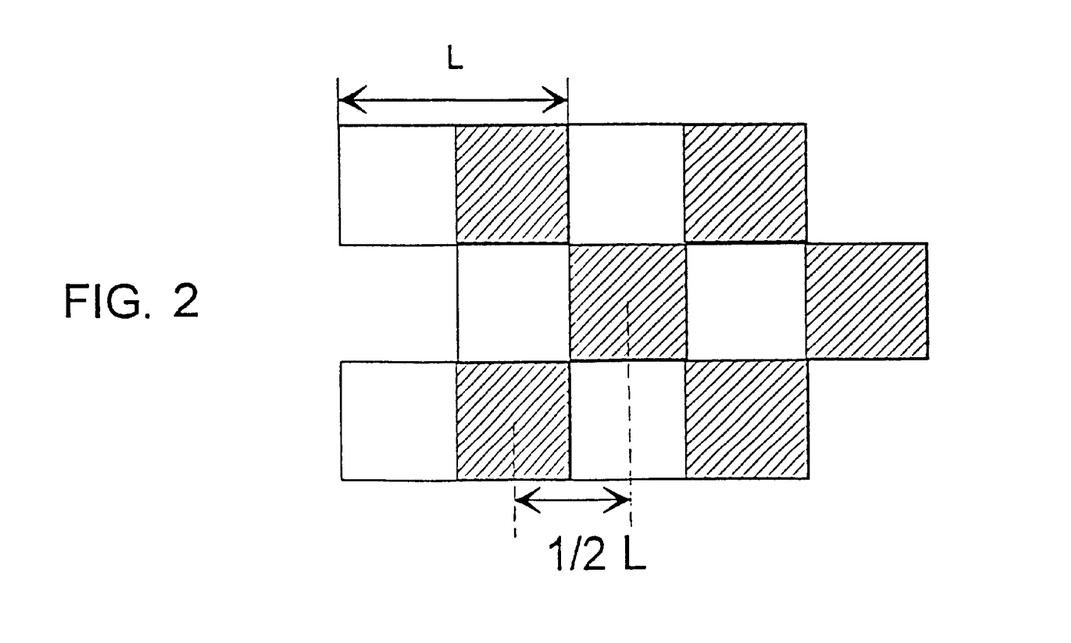
FIG. 2 shows an example of an assembly of image sensor members according to the invention, as shown, for example, in FIG. 1.
Figure 5:
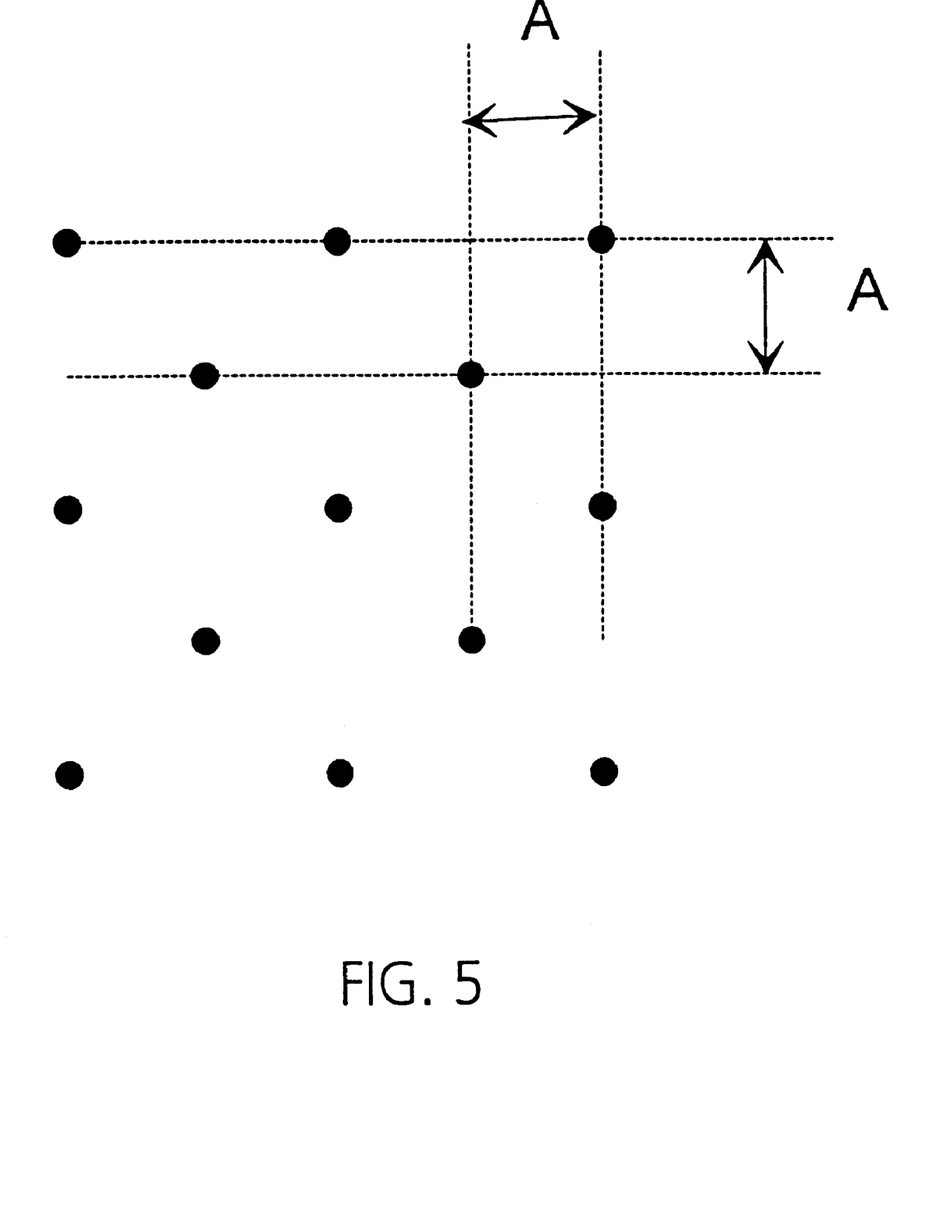
FIG. 5 shows an example of an arrangement of the centers of gravity of the light-sensitive surfaces of the individual image sensor members according to a preferred embodiment of the present invention.

In that regard, the centers of gravity (centerpoint) of the light-sensitive areas of the individual image sensor members are preferably disposed in a grid line in such a way that they fall on half of the distance between two centers of gravity of light-sensitive surfaces of the individual image sensor members of the preceding grid line, as shown in FIG. 5. According to a particularly preferred embodiment, a type of checkerboard pattern is produced, as shown in FIG. 2. The image information of the areas of each image sensor member lying between the light-sensitive surfaces can then be obtained by known interpolation processes, as known, for example, from the contribution by Kris S. Balch, "Replacing 16 mm Film Cameras with High Definition Digital Cameras" in "Ultrahigh-and High-Speed Photography, Videography, and Photonics '94," Proceedings of SPIE —The International Society for Optical Engineering, Jul. 27–28, 1994, Vol. 2273.

In that regard, such a grid can advantageously be produced by assigning individual image sensor members, which are designed as defined in claim 1, to a sensor of any chosen size.

Therefore, the fact that, in a known CMOS sensor in APS technology, only one portion of the sensor surface is available for light sensors is deliberately used in the present invention by disposing light-sensitive and non-light-sensitive parts in such a way that an image can be reconstructed using interpolation processes which is of higher quality than an image having the same number of image sensor members but another shape and assembly of image sensor members. According to the present invention, known interpolation processes can be used for interpolation.

The interpolation process can be implemented directly into the hardware so that the interpolation process is not time-critical, i.e., does not cause a delay in the image recording process. In addition, the interpolation process can be shifted back in time, so that it takes place not during image recording but rather not until image processing.

The calculation unit for interpolation of the obtained data can also be contained in the circuit section of each individual image sensor member.

According to the present invention, the following advantages are achieved:
1. The technological background condition that the entire image sensor member surface is not available for the light-sensitive members or surfaces (filling factor <<100%, because the switching in each image sensor member requires space) is deliberately used. Structures are produced that allow the use of simpler, very effective interpolation processes. The effectiveness of those interpolation processes is due to the fact that the entire sensor surface or image sensor member surface is not occupied by light-sensitive members, but rather that light-sensitive and non-light-sensitive regions are disposed appropriately.
2. The simplest conversion of the obtained pixels into an image format in the form of a regular Cartesian matrix for further use in image processing. The "blank fields" of the checkerboard structure can easily be obtained by interpolation, thereby providing an image with square pixels.
3. Because, due to the device according to the invention, effectively fewer pixels are required in the image sensor for an image of equivalent quality, faster and more cost-effective cameras can be achieved.

The present invention is described in greater detail below in reference to t accompanying drawings.

BRIEF DESCRIPTION OF THE DRAWINGS

FIG. 1, including

FIG. 6c shows an arrangement according to the invention of the image sensor members shown in FIG. 4a.

DETAILED DESCRIPTION OF THE PRESENT INVENTION

Figure 1A:
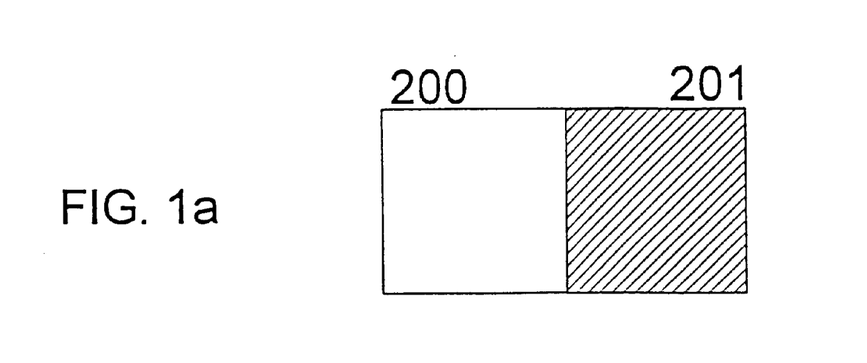
FIGS. 1a and 1b, shows an example of an embodiment of an image sensor member according to the invention.

An image sensor member according to the present invention, as shown in FIG. 1a, is designed to be rectangular and has a predetermined length and a predetermined width. According to a preferred embodiment, the ratio between the length and width is 2 to 1, but other appropriate selected ratios are also possible. One part (201) of the image sensor member is provided for the light-sensitive member, for example, a photodiode or a phototransistor, while another part (200) is provided for the non-light-sensitive circuit section.

Figure 1B:
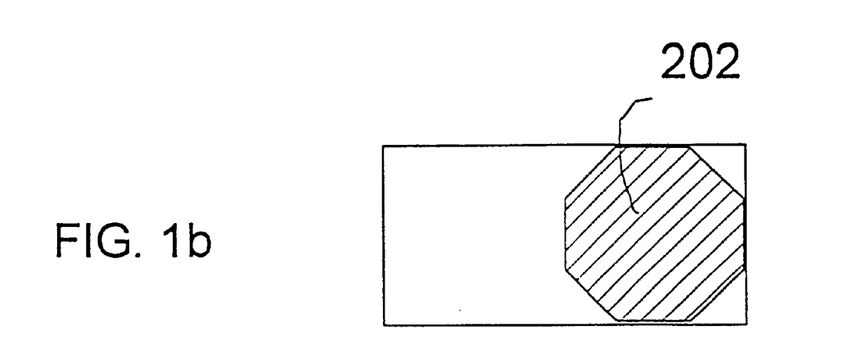

As shown in FIG. 1b, according to the present invention, the light-sensitive square surface is preferably cut at the corners to create space for the wiring. That produces an octagonal shape for the photodiode or the phototransistor (202). Therefore, as shown in FIG. 1b, the light-sensitive member is disposed in such a way that the light-sensitive surface covers a portion of the image sensor member substantially on its entire width. However, in that regard, according to the present invention, the light-sensitive surface may have any chosen shape, for example, hexagonal, rectangular, or circular, but also any chosen irregular shape. It is merely important for the present invention that it covers a portion of the image sensor member substantially on its entire width. In that regard, "substantially on its entire width" means completely except for small areas that have been left free for provision of the wiring sections.

According to the present invention, known image sensor members or image sensor members according to the invention are disposed in such a way that the centers of gravity of the light-sensitive surfaces of the individual image sensor members are disposed in the shape of at least two square grids which are offset relative to one another, with the grid lines each being parallel to the lines or columns of the image to be recorded. Depending on the orientation in which the image sensor is observed, this means that the individual grid lines represent either the rows or the columns of the image to be recorded.

In that regard, the centers of gravity of the light-sensitive surfaces of the individual image sensor members are preferably disposed in a grid line in such a way that they fall on half of the distance between two centers of gravity of light-sensitive surfaces of the individual image sensor members, as shown in FIG. 5. According to a particularly preferred embodiment of the present invention, a type of checkerboard pattern, as shown in FIG. 2, is produced.

Figure 3:
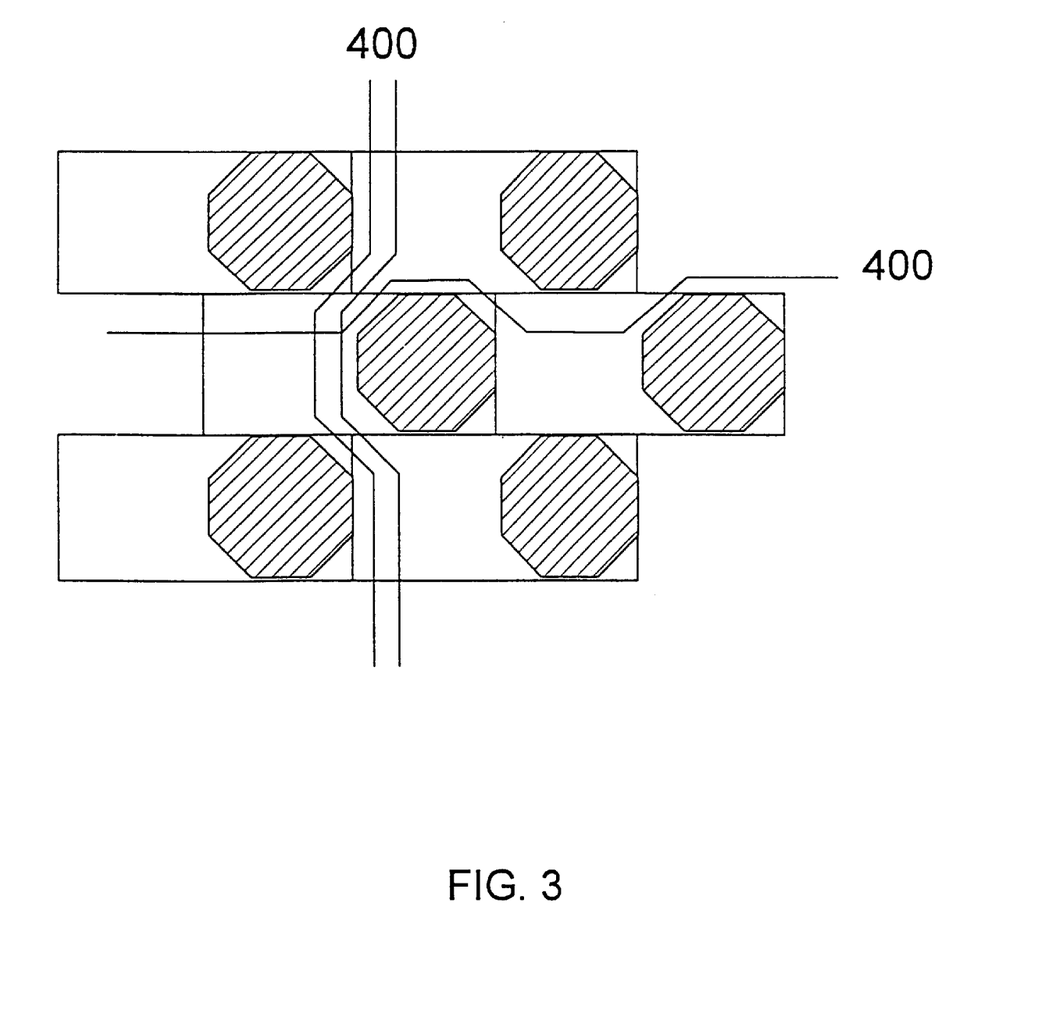
FIG. 3 shows an image sensor according to the invention having the assembly of image sensor members shown in FIG. 2.

The wiring of the image sensor members occurs according to FIG. 3. The size of the cut-off corners is chosen to be of a size necessary for the wiring (400).

Figure 6A:
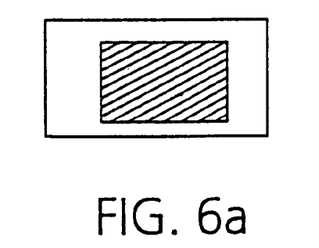
FIG. 6a shows an additional image sensor member not according to the invention, which can be disposed according to FIG. 6b into an arrangement according to the invention.
Figure 6B:
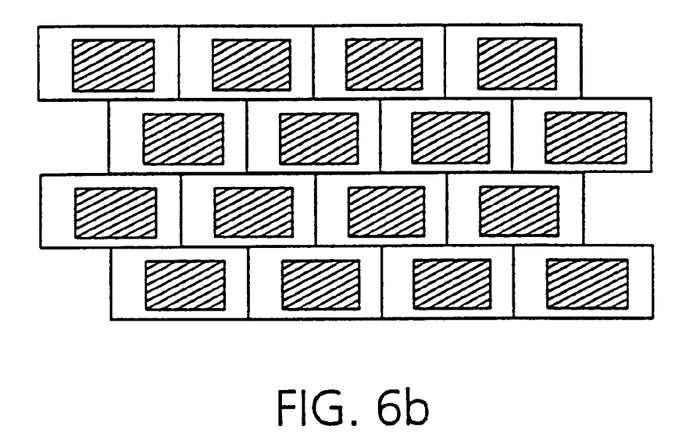
Figure 6C:
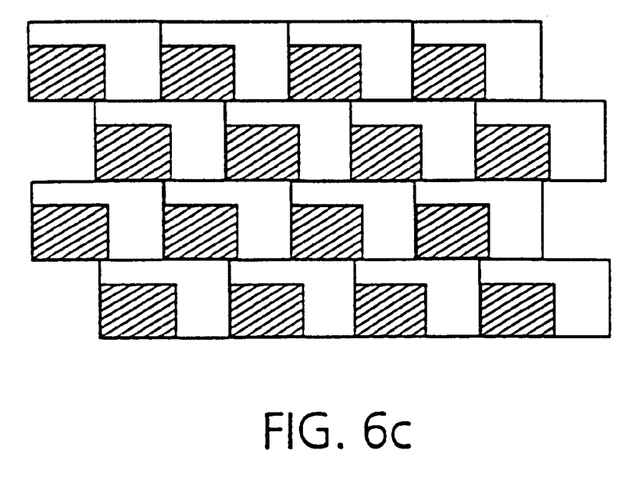

Although the design of the individual image sensor member is useful for the assembly of image sensor members according to the invention, the present invention is in no way limited to being able to use only such image sensor members for the assembly according to the invention. With an assembly according to the invention the individual image sensor members can also be constructed as shown in FIG. 6a or also FIG. 4a. FIGS. 6b and 6c show assemblies of image sensor members which are each constructed as shown in FIG. 4a or FIG. 6a.

During operation of the image sensor, a photocurrent is generated in the light-sensitive surfaces of the individual image sensor members by the incident light, which photocurrent is integrated spatially over the size of the image sensor member and temporally over the illumination time in a processing device (not shown), so that an image signal producing the gray levels is produced. The image signals of the non-light-sensitive parts of the image sensor members are obtained by known interpolation processes in the calculation unit (not shown). Using the aforementioned technology allows resolution to be increased at a fixed number of image sensor members. i.e., to be doubled when the light-sensitive surface takes up half of the image sensor member, or allows the number of image sensor members to be reduced at a fixed resolution, i.e., to be reduced by half when the light-sensitive surface takes up half of the image sensor member, which reduces costs and increases speed of the image sensor.

The image sensor member according to the invention can also have a length-width ratio of 3:1 or more, with the light-sensitive surface disposed on one-third or less of the image sensor member. It is also conceivable for the image sensor member according to the invention to have a length-width ratio of 4:1, with the light-sensitive surface filling in half of the image sensor member and disposed on the center of the image sensor member.

Due to its increased speed, the image sensor according to the invention can advantageously be used in high-speed cameras, for example, for high-speed videotaping. For example, an image sensor having $512^2$ conventional sensor members can be used for a camera taking 1,000 images/second. According to the present invention, an image sensor having 256×512 sensor members according to the invention provides $512^2$ pixels at comparable image quality in a camera taking 2,000 images/second.

What is claimed is:

1. An apparatus comprising:
    a plurality of rectangular CMOS image sensor members, each rectangular CMOS image sensor member having a predetermined length and width, and comprising:
    a light-sensitive surface having a centerpoint;
    a circuit section;
    a wiring section for connecting said circuit section to an external circuit;
    a first portion in which said circuit section and wiring section are positioned;
    said light sensitive surface being located outside of said first portion;
    said plurality of rectangular CMOS image sensor members being arranged into a plurality of rows,
    wherein said center points of said light sensitive surfaces of one row are positionally offset from said center points of the light sensitive surfaces of an adjacent row, and
    wherein said rectangular CMOS image sensor members are arranged in a checkerboard pattern so that said light-sensitive surfaces are disposed between said circuit sections in horizontal and vertical directions and corners of said light-sensitive surfaces are contiguous in diagonal directions.

2. An apparatus according to claim 1, wherein each row comprises a plurality of members positioned to each other so that the predetermined widths of said members are vertically oriented and contiguous and the predetermined lengths of said member are horizontally oriented and aligned in a substantially parallel manner;
    wherein each row is configured so that the vertically oriented widths of said members with respect to a row above and row below a middle row, are offset from the vertically oriented width sides of each member of said middle row; and
    wherein said centerpoints of each light-sensitive surface are separated by a circuit section with respect to said rows and with respect to a vertical direction.

3. An apparatus according to claim 1, wherein said centerpoints in adjacent rows are positionally offset with respect to direction cross-wise to said rows.

4. An apparatus according to claim 1, wherein said light-sensitive surface and at least a part of said first portion of a same image sensor member are arranged in a same row.

5. An apparatus according to claim 1, wherein said rectangular CMOS image sensor members are arranged in a checkboard pattern so that said light-sensitive surfaces are disposed between said circuit sections in horizontal and vertical directions and corners of said light-sensitive surfaces are contiguous in diagonal directions.

6. An apparatus according to claim 1, wherein said light-sensitive surface substantially covers an entire width of said member.

7. An apparatus according to claim 1, wherein said member has a length to width ratio of one of 2:1.

8. An apparatus according to claim 1, wherein said member has a length to width ratio of one of 3:1.

9. An apparatus according to claim 1, wherein said member has a length to width ratio of one of 4:1.

10. An apparatus according to claim 1, wherein said light-sensitive surface is formed as one of a square, rectangle, hexagon, and circle.

11. An apparatus according to claim 1, wherein said light-sensitive surface is disposed on about one half of said image sensor member.

12. An apparatus according to claim 1, wherein said light-sensitive surface is one of a photodiode, phototransistor, and photoresistor.

13. An apparatus according to claims 1, in combination with a high-speed camera.

14. An apparatus according to claim 1, further comprising:
    wiring members connecting said wiring sections of said image sensor members to said circuit outside said image sensor member; and
    a calculation unit, connected to said wiring members, for interpolation of data obtained from said apparatus.

15. An apparatus according to claim 1, wherein said centerpoints of said light sensitive surfaces positioned in said row above and row below are aligned in a horizontal and vertical direction; and
    said centerpoints of said light sensitive surfaces positioned in said middle row, are offset by half the distance between the distance between said centerpoints from said row above and row below, in a horizontal and vertical direction.

16. An apparatus according to claim 1, wherein with respect to said cross-wise direction to said rows, centerpoints in adjacent rows are not aligned with each other.

17. An apparatus according to claim 1, wherein said centerpoints of said one row are positioned substantially at a midpoint between adjacent centerpoints of said adjacent row.

18. An apparatus according to claim 1, wherein said external circuit comprises a calculation unit adapted for interpolation of data, and said apparatus further comprises wiring members arranged to connect said wiring sections to said calculation unit.

19. An apparatus according to claim 1, wherein a spacing distance between adjacent centerpoints in each row is substantially the same, and wherein centerpoints in said one row are arranged at one-half of the spacing distance of said adjacent row.

* * * * *